United States Patent
Georgin et al.

(10) Patent No.: US 11,364,884 B2
(45) Date of Patent: Jun. 21, 2022

(54) SELECTIVE BRAKING OF CARBON BRAKES TO IMPROVE LIFE

(71) Applicant: GOODRICH CORPORATION, Charlotte, NC (US)

(72) Inventors: Marc Georgin, Dayton, OH (US); Michael Kordik, Dayton, OH (US)

(73) Assignee: Goodrich Corporation, Charlotte, NC (US)

( * ) Notice: Subject to any disclaimer, the term of this patent is extended or adjusted under 35 U.S.C. 154(b) by 560 days.

(21) Appl. No.: 16/460,845

(22) Filed: Jul. 2, 2019

(65) Prior Publication Data
US 2021/0001823 A1    Jan. 7, 2021

(51) Int. Cl.
| G01C 23/00 | (2006.01) |
| B60T 8/17 | (2006.01) |
| B60T 17/22 | (2006.01) |
| B64C 25/44 | (2006.01) |
| F16D 66/02 | (2006.01) |
| F16D 66/00 | (2006.01) |

(52) U.S. Cl.
CPC .......... *B60T 8/1703* (2013.01); *B60T 17/221* (2013.01); *B64C 25/44* (2013.01); *F16D 66/021* (2013.01); *F16D 2066/001* (2013.01)

(58) Field of Classification Search
CPC ..... B60T 8/1703; B60T 17/221; B64C 25/44; F16D 66/021; F16D 2066/001; G01C 23/00
USPC .............................................................. 701/3
See application file for complete search history.

(56) References Cited

U.S. PATENT DOCUMENTS

| 4,986,610 | A | * | 1/1991 | Beck .......................... B60T 8/00 188/106 P |
| 5,845,975 | A | * | 12/1998 | Wells ...................... B60T 8/325 244/110 A |
| 6,478,252 | B1 | | 11/2002 | Stimson et al. |
| 7,963,620 | B2 | | 6/2011 | DeVlieg |
| 8,548,652 | B2 | | 10/2013 | DeVlieg et al. |
| 8,567,874 | B2 | * | 10/2013 | DeVlieg ................. B64C 25/44 244/110 A |
| 8,634,971 | B2 | * | 1/2014 | Cahill ................... F16D 66/026 244/76 R |
| 9,809,302 | B2 | | 11/2017 | Howell et al. |
| 9,815,443 | B2 | | 11/2017 | Miller |
| 9,914,442 | B2 | | 3/2018 | Kanemori et al. |

(Continued)

FOREIGN PATENT DOCUMENTS

| EP | 0384071 | 8/1990 |
| EP | 3363697 | 8/2018 |

(Continued)

OTHER PUBLICATIONS

European Patent Office, European Search Report dated May 15, 2020 in Application No. 19215759.2.

*Primary Examiner* — Shardul D Patel
(74) *Attorney, Agent, or Firm* — Snell & Wilmer L.L.P.

(57) ABSTRACT

A method for active brake selection, in accordance with various embodiments is disclosed. The method comprises detecting an outbound taxiing event for an aircraft. The method further comprises determining whether an inboard or outboard brake has less wear than a respective inboard or outboard brake on a respective landing gear. The method may further comprise selecting an inboard or outboard brake to use during the outbound taxiing event.

20 Claims, 7 Drawing Sheets

(56) References Cited

U.S. PATENT DOCUMENTS

| | | | | |
|---|---|---|---|---|
| 10,807,585 B2* | 10/2020 | Georgin | ................ | B60T 8/1703 |
| 2009/0210126 A1* | 8/2009 | Dellac | ..................... | B64C 25/48 |
| | | | | 701/70 |
| 2010/0086881 A1* | 4/2010 | Matsumoto | ............. | C09B 57/00 |
| | | | | 252/182.28 |
| 2010/0222942 A1* | 9/2010 | Devlieg | ................... | B60T 8/00 |
| | | | | 701/3 |
| 2011/0278915 A1* | 11/2011 | DeVlieg | ................ | B60T 17/22 |
| | | | | 701/3 |
| 2012/0130613 A1* | 5/2012 | DeVlieg | ............... | B60T 8/1703 |
| | | | | 701/70 |
| 2020/0023949 A1* | 1/2020 | Cahill | .................. | B60T 8/1761 |
| 2020/0307530 A1* | 10/2020 | Georgin | ............... | B60T 8/1703 |

FOREIGN PATENT DOCUMENTS

| | | |
|---|---|---|
| FR | 2898334 | 9/2007 |
| GB | 2470098 | 11/2010 |
| WO | 2007084449 | 7/2007 |
| WO | 2010088396 | 8/2010 |

* cited by examiner

SELECTIVE BRAKING OF CARBON BRAKES TO IMPROVE LIFE

FIELD

The present disclosure is directed to aircraft braking systems and, more particularly, to systems and methods for selecting an outboard or an inboard brake of an aircraft based on wear and/or temperature data.

BACKGROUND

Various aircraft brake systems include a brake control unit (BCU) that controls the various brakes of the aircraft. During taxi out, carbon brakes are colder and quicker to wear than when the carbon brakes are hotter. Various BCUs provide control to inboard and/or outboard brakes of a right landing gear and/or a left landing gear of the aircraft.

SUMMARY

A method for active brake selection, in accordance with various embodiments, is disclosed. The method may comprise: detecting, by a brake control unit (BCU), an outbound taxiing event in an aircraft; determining, by the BCU, a first inboard wear state of a left landing gear inboard brake and a first outboard wear state of a left landing gear outboard brake; selecting, by the BCU, the left landing gear inboard brake or the left landing gear outboard brake as a selected left landing gear brake for exclusive use during the outbound taxiing event; determining, by the BCU, a second inboard wear state of a right landing gear inboard brake and a second outboard wear state of a right landing gear outboard brake; selecting, by the BCU, at least one of the right landing gear inboard brake or the right landing gear outboard brake as a selected right landing gear brake for exclusive use during the outbound taxiing event.

In various embodiments, the method further comprises: monitoring, by the BCU, a first temperature of the selected left landing gear brake and a second temperature of the selected right landing gear brake during the outbound taxiing event. The method may further comprise: alternating, by the BCU, the selected left landing gear brake to an unselected left landing gear brake if at least one of the first temperature exceeds a predetermined temperature threshold or the selected right landing gear brake to an unselected right landing gear brake if the second temperature exceeds the predetermined temperature threshold. The first inboard wear state, the first outboard wear state, the second inboard wear state, and the second outboard wear state may be determined by brake wear sensors comprising a linear variable differential transform (LVDT) configured to measure linear displacement of a brake stack. The first inboard wear state, the first outboard wear state, the second inboard wear state, and the second outboard wear state may be calculated, by the BCU, using a brake application history from an aircraft data source. The monitoring of the first temperature may be by a temperature probe proximate the selected left landing gear brake.

A system for active brake selection, in accordance with various embodiments, is disclosed. The system may comprise: a left landing gear outboard brake temperature sensor coupled to a left landing gear of an aircraft; a left landing gear inboard brake temperature sensor coupled to the left landing gear of the aircraft; a right landing gear outboard brake temperature sensor coupled to a right landing gear of the aircraft; a right landing gear inboard brake temperature sensor coupled to the right landing gear of the aircraft; and a brake control unit (BCU). The BCU may perform operations comprising: detecting, by the BCU, an outbound taxiing event in the aircraft; determining, by the BCU, a first inboard wear state of a left landing gear inboard brake and a first outboard wear state of a left landing gear outboard brake; selecting, by the BCU, the left landing gear inboard brake or the left landing gear outboard brake as a selected left landing gear brake for exclusive use during the outbound taxiing event; determining, by the BCU, a second inboard wear state of a right landing gear inboard brake and a second outboard wear state of a right landing gear outboard brake; and selecting, by the BCU, the right landing gear inboard brake or the right landing gear outboard brake as a selected right landing gear brake for exclusive use during the outbound taxiing event.

In various embodiments, the system further comprises a left landing gear outboard wear sensor coupled to the left landing gear of the aircraft, the left landing gear outboard wear sensor in electronic communication with the BCU. The operations may further comprise: monitoring, by the BCU, a first temperature measured by a first temperature sensor of the selected left landing gear brake and a second temperature measured by a second temperature sensor of the selected right landing gear brake during the outbound taxiing event. The operations may further comprise: alternating, by the BCU, the selected left landing gear brake to an unselected left landing gear brake if the first temperature exceeds a predetermined temperature threshold or the selected right landing gear brake to an unselected right landing gear brake if the second temperature exceeds the predetermined temperature threshold. The left landing gear outboard wear sensor may comprise a linear variable differential transform (LVDT). The system may further comprise an aircraft data source electrically coupled to the BCU. The first inboard wear state may be determined by calculating an expected first inboard wear state based on a first inboard brake application history provided by the aircraft data source.

A brake control unit (BCU), in accordance with various embodiments, is disclosed. The may comprise: a processor and a non-transitory, tangible computer readable storage medium in electronic communication with the processor, the non-transitory, tangible computer readable storage medium having instructions stored thereon. The tangible computer readable storage medium in response to execution by the processor may cause the processor to perform operations comprising: detecting, by the processor, an outbound taxiing event in an aircraft; determining, by the processor, a first inboard wear state of a left landing gear inboard brake and a first outboard wear state of a left landing gear outboard brake; selecting, by the processor, the left landing gear inboard brake or the left landing gear outboard brake as a selected left landing gear brake for exclusive use during the outbound taxiing event; determining, by the processor, a second inboard wear state of a right landing gear inboard brake and a second outboard wear state of a right landing gear outboard brake; and selecting, by the processor, the right landing gear inboard brake or the right landing gear outboard brake as a selected right landing gear brake for exclusive use during the outbound taxiing event; further comprising an aircraft data source in electronic communication with the processor, wherein the aircraft data source is configured to transmit brake application history to the processor.

In various embodiments, the operations further comprise: monitoring, by the processor, a first temperature of the selected left landing gear brake and a second temperature of the selected right landing gear brake during the outbound taxiing event. The operations may further comprise: alternating, by the processor, the selected left landing gear brake to an unselected left landing gear brake if the first temperature exceeds a predetermined temperature threshold or the selected right landing gear brake to an unselected right landing gear brake if the second temperature exceeds the predetermined temperature threshold. The first inboard wear state, the first outboard wear state, the second inboard wear state, and the second outboard wear state may be calculated, by the processor, using the brake application history from the aircraft data source. The processor may be in electrical communication with a plurality of brake wear sensors. The processor may be in electrical communication with a plurality of brake temperature sensors.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

Figure 1:
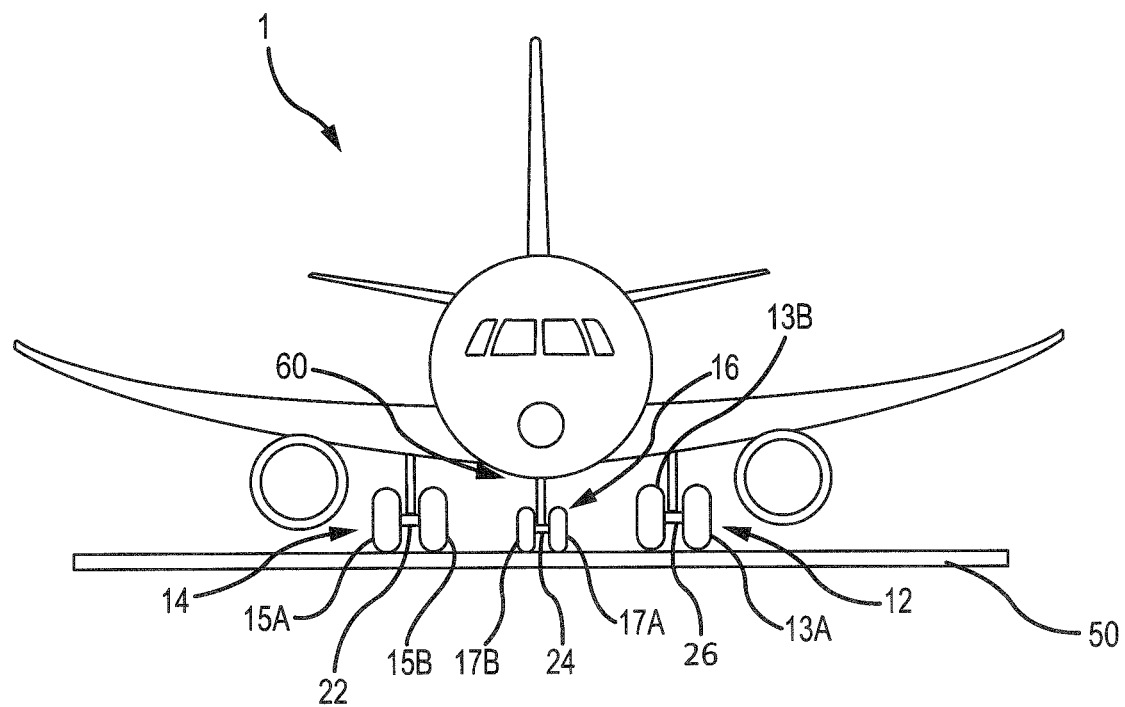
FIG. 1 is a illustrating an aircraft having landing gear, in accordance with various embodiments.

In various embodiments, and with reference to FIG. 1, a front view of an aircraft 1 on a runway 50 is depicted. Aircraft 1 may include landing gear such as a left main landing gear (LMLG) 12, a right main landing gear (RMLG) 14, and a nose landing gear (NLG) 16. LMLG 12, RMLG 14, and NLG 16 may generally support aircraft 1 when aircraft 1 is not flying, allowing aircraft 1 to taxi, take off and land without damage.

LMLG 12 may include an outboard wheel 13A and an inboard wheel 13B coupled by a strut 26; RMLG 14 may include an outboard wheel 15A and an inboard wheel 15B coupled by a strut 22; and NLG 16 may include a nose wheel 17A and a nose wheel 17B coupled by a strut 24. The nose wheels differ from the main wheels in that the nose wheels may not include a brake, in accordance with various embodiments. In various embodiments, aircraft 1 may comprise any number of landing gears and each landing gear may comprise any number of wheels.

Aircraft 1 may also include a primary braking system 60, which may be applied to any wheel of any landing gear. Braking system 60 of aircraft 1 may comprise a collection of subsystems that produce output signals for controlling the braking force and/or torque applied at each wheel (e.g., outboard wheel 13A, inboard wheel 13B, outboard wheel 15A, inboard wheel 15B, nose wheel 17A, and/or nose wheel 17B), together with various brakes, as discussed further herein. Braking system 60 may communicate with the brakes of each landing gear (e.g., LMLG 12, RMLG 14, and/or NLG 16), and each brake may be mounted to each wheel to apply and release braking force on one or more wheels (e.g., as described herein).

Aircraft wheel and brake assemblies may typically include a non-rotatable wheel support, a wheel mounted to the wheel support for rotation, and a brake disk stack. The brake stack may also have alternating rotor and stator disks mounted with respect to the wheel support and wheel for relative axial movement. Each rotor disk may be coupled to the wheel for rotation therewith, and each stator disk may be coupled to the wheel support against rotation. A back plate may be located at the rear end of the disk stack and a brake head may be located at the front end. The brake head may house one or more actuator rams that extend to compress the brake disk stack against the back plate, or the brake disk stack may be compressed by other means. Torque is taken out by the stator disks through a static torque tube or the like. The actuator rams may be electrically operated actuator rams or hydraulically operated actuator rams, although some brakes may use pneumatically operated actuator rams.

In brake systems that employ fluid powered (hydraulic or pneumatic power) actuator rams, the actuator ram may be coupled to a power source via a brake servo valve (BSV) and a shutoff valve (SOV). The SOV effectively functions as a shutoff valve, wherein in a first position (e.g., an armed position), fluid pressure is permitted to pass through the valve, while in a second position (e.g., a disarmed position) fluid pressure is restricted or prevented from passing through the valve. During normal braking, the SOV is in the armed position, thereby permitting the flow of fluid pressure. The BSV, based on braking commands from the pilot (often via an electronic controller that may implement, for example, brake selection logic) controls the amount of fluid pressure provided to the actuator ram, and thus, the braking force applied to the wheel. To prevent or minimize unintentional braking (e.g., due to a faulty servo valve) at various times, the SOV is set in the disarmed position, thereby removing or decreasing fluid pressure from the BSV. Since the BSV does not receive sufficient fluid pressure, it cannot provide fluid pressure to the actuator ram, and thus, braking cannot be affected.

In electronic brakes, a brake controller (or controller) is coupled to one or more electromechanical actuator controllers (EMAC) for a brake, which drives one or more electromechanical brake actuators. The brake controller may be in communication with a brake pedal, and thus may control the EMAC in accordance with pilot/copilot braking commands. In various aircraft, other means are used to compress a brake disk stack. A brake controller may comprise a processor and a tangible, non-transitory memory. The brake controller may comprise one or more logic modules that implement brake logic. In various embodiments, the brake controller may comprise other electrical devices to implement brake logic.

Figure 2:
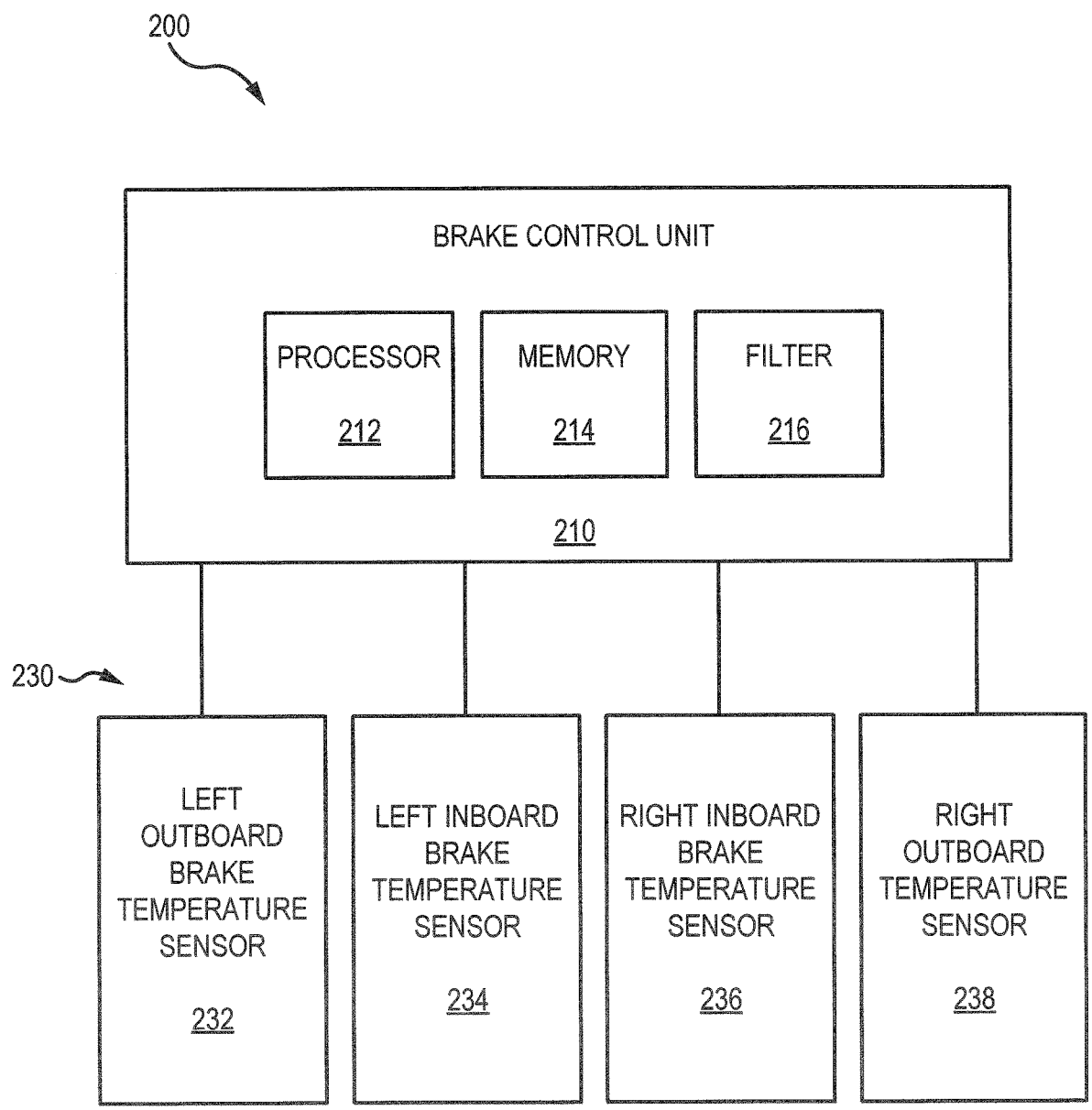
FIG. 2 is a braking system having a brake control unit (BCU) of the aircraft of FIG. 1, in accordance with various embodiments.

In various embodiments, and with reference to FIG. 2, an aircraft braking system 200 is disclosed. Aircraft braking system 200 may be configured to select a brake for an aircraft (e.g., aircraft 1 of FIG. 1) during a taxiing phase, or the like. In that respect, aircraft braking system 200 may control brake selection, for example, whether an outboard brake or and inboard brake is used for taxiing, and/or the like. Aircraft braking system 200 may be configured to select between exclusive use of an inboard or outboard brake prior to a taxi event and/or monitor the selected brake during use. For example, an inboard brake of a landing gear assembly may be chosen prior to an aircraft taxiing out based on having less wear than an outboard brake of the landing gear assembly. During taxiing, aircraft braking system 200 can monitor the selected brake and switch to the non-selected brake if a temperature threshold for the selected brake is breached. Furthermore, aircraft braking system 200 may be used to control, for example, four or more aircraft wheels (e.g., outboard wheel 13A, inboard wheel 13B, outboard wheel 15A, inboard wheel 15B, wheel 17A, and/or wheel 17B of FIG. 1). Aircraft braking system 200 may be configured to select a single wheel from LMLG 12 and a single wheel from RMLG 14 for use during taxiing to maintain differential braking. Any number and configuration of wheels controlled by aircraft braking system 200 is within the scope of the present disclosure.

In various embodiments, aircraft braking system 200 may also be integrated into computer systems onboard an aircraft (e.g., aircraft 1 of FIG. 1) such as, for example, a brake control unit (BCU), a full authority digital engine control (FADEC), an engine-indicating and crew-alerting system (EICAS), and/or the like. Aircraft braking system 200 may also be a standalone computer system separate from the aircraft and in electronic communication with the aircraft, as described in further detail herein. Aircraft braking system 200 may include one or more processors and/or one or more tangible, non-transitory memories and be capable of implementing logic. As described herein, each "controller", and/or the like may also comprise an individual processor and/or one or more tangible, non-transitory memories and be capable of implementing logic. In various embodiments, each controller, and/or the like may also be implemented in a single processor (e.g., aircraft braking system 200 may comprise a single processor). Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, aircraft braking system 200 may comprise a processor 212 configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, aircraft braking system 200 may comprise a brake control unit (BCU) 210 in operative communication with one or more brake temperature sensors 230. For example, aircraft braking system 200 may comprise a left outboard brake temperature sensor 232, a left inboard brake temperature sensor 234, a right inboard brake temperature sensor 236, and a right outboard brake temperature sensor 238. In various embodiments, and with brief reference again to FIG. 1, LMLG 12 and RMLG 14 may each comprise two or more wheels, and a brake temperature sensor 330 may be coupled proximate to each wheel of LMLG 12 and RMLG 14. For example, LMLG 12 may comprise an axle comprising a left outboard brake temperature sensor 232 coupled proximate the left outboard brake and a left inboard brake temperature sensor 234 coupled proximate a left inboard brake. Similarly, RMLG 14 may comprise an axle comprising a right outboard brake temperature sensor 238 coupled proximate a right outboard brake and a right inboard brake temperature sensor 236 coupled proximate a right inboard brake. The various components may be electrically coupled. In various embodiments, the various components may communicate via wireless communications. For example, brake temperature sensors 230 may wirelessly transmit temperature measurements to BCU 210.

In various embodiments, BCU 210 may comprise various components to aid in selecting an inboard or outboard brake. For example, BCU 210 may comprise a computing device (e.g., processor 212) and an associated memory 214. Processor 212 may comprise any suitable processor, such as, for example, a general purpose processor, a digital signal processor (DSP), an application specific integrated circuit (ASIC), a field programmable gate array (FPGA) or other programmable logic device, discrete gate or transistor logic, discrete hardware components, or any combination thereof. Memory 214 may comprise an article of manufacture including a tangible, non-transitory computer-readable storage medium having instructions stored thereon that, in response to execution by the computing device (e.g., processor 212), cause the computing device to perform various methods, as discussed further herein.

In various embodiments, BCU 210 may further comprise a filter 216 in electronic communication with processor 212. Filter 216 may be configured to filter data received from the brake temperature sensors 230. In various embodiments, filter 216 may comprise a low pass filter to reduce or eliminate high frequency noise.

In various embodiments, each brake temperature sensor 230 may be configured to measure a brake temperature of the corresponding brake. Brake temperature sensors 230 may comprise any device capable of measuring a brake temperature. For example, in various embodiments, brake temperature sensors 230 may comprise a negative temperature coefficient (NTC) thermistor, a resistance temperature detector (RTD), a thermocouple, a semi-conductor based sensor, or the like. In various embodiments, brake temperature sensors 230 may comprise a temperature probe and may be coupled directly to a brake system, or proximate the brake system. When brake temperature sensors 230 are disposed proximate the brake system, brake temperatures sensors may be configured to interpolate a brake temperature.

Figure 3:
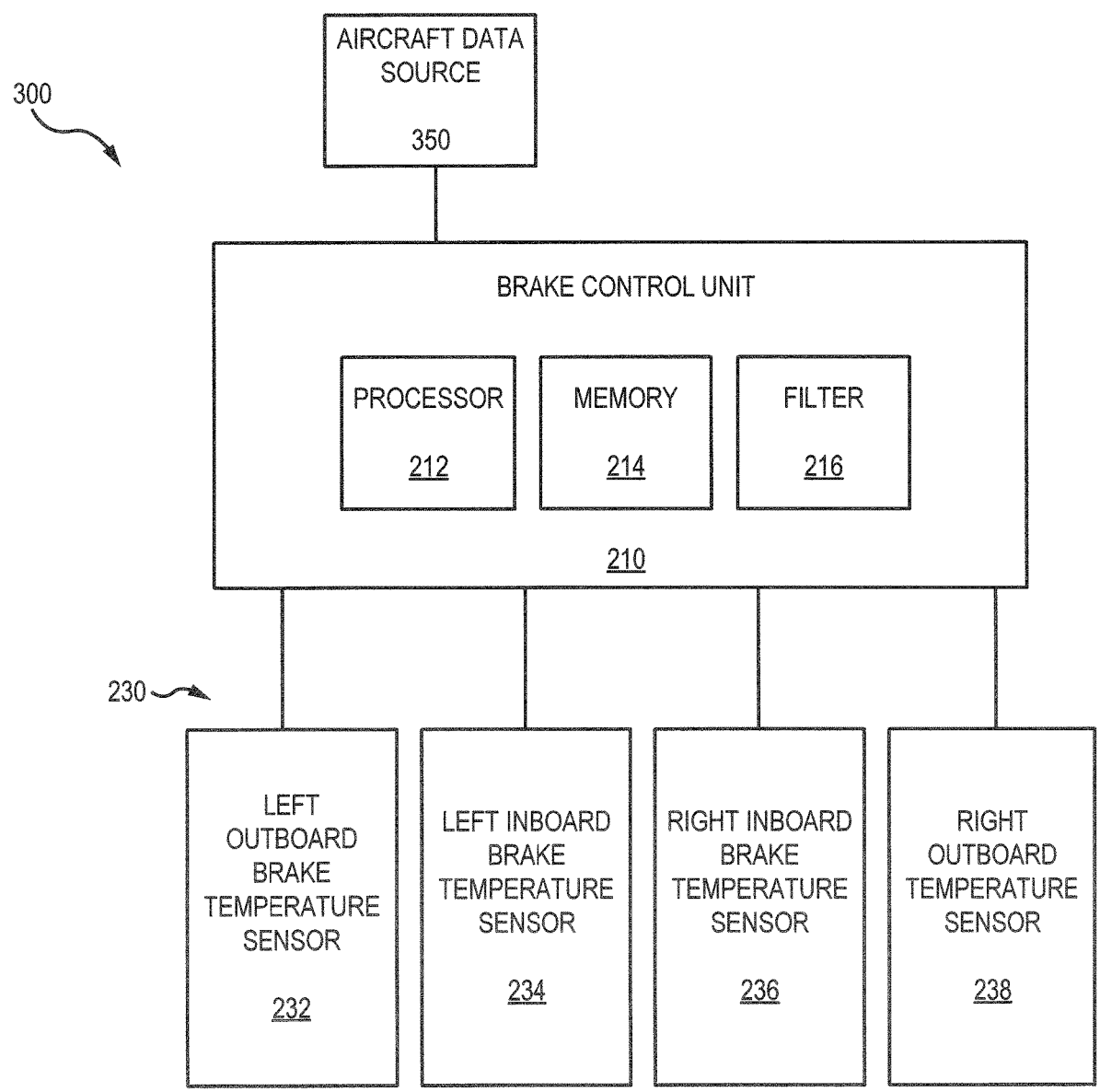
FIG. 3 is a braking system having a brake control unit (BCU) of the aircraft of FIG. 1, in accordance with various embodiments.

In various embodiments, and with reference to FIG. 3, aircraft braking system 300 for selecting a brake during taxi may further comprise an aircraft data source 350. Aircraft data source 350 may be electrically coupled to BCU 210. In various embodiments, aircraft data source 350 may be in wireless communication with BCU 210. Aircraft data source 350 may comprise one or more components in aircraft 1 configured to gather data related to aircraft 1, such as, for example, an avionics unit, a full authority digital engine control (FADEC), and/or similar such systems or components. Aircraft data source 350 may be configured to transmit the gathered data to BCU 310. Aircraft data source 350 may gather aircraft status information, such as, for example, the presence of weight on wheels, wheel specific brake pressure, duration of applied brake pressure, aircraft velocity, aircraft acceleration, aircraft speed information, aircraft aerodynamic characteristics, aircraft mass, engine throttle angle position, air temperature, and/or other suitable aircraft data.

Figure 4:
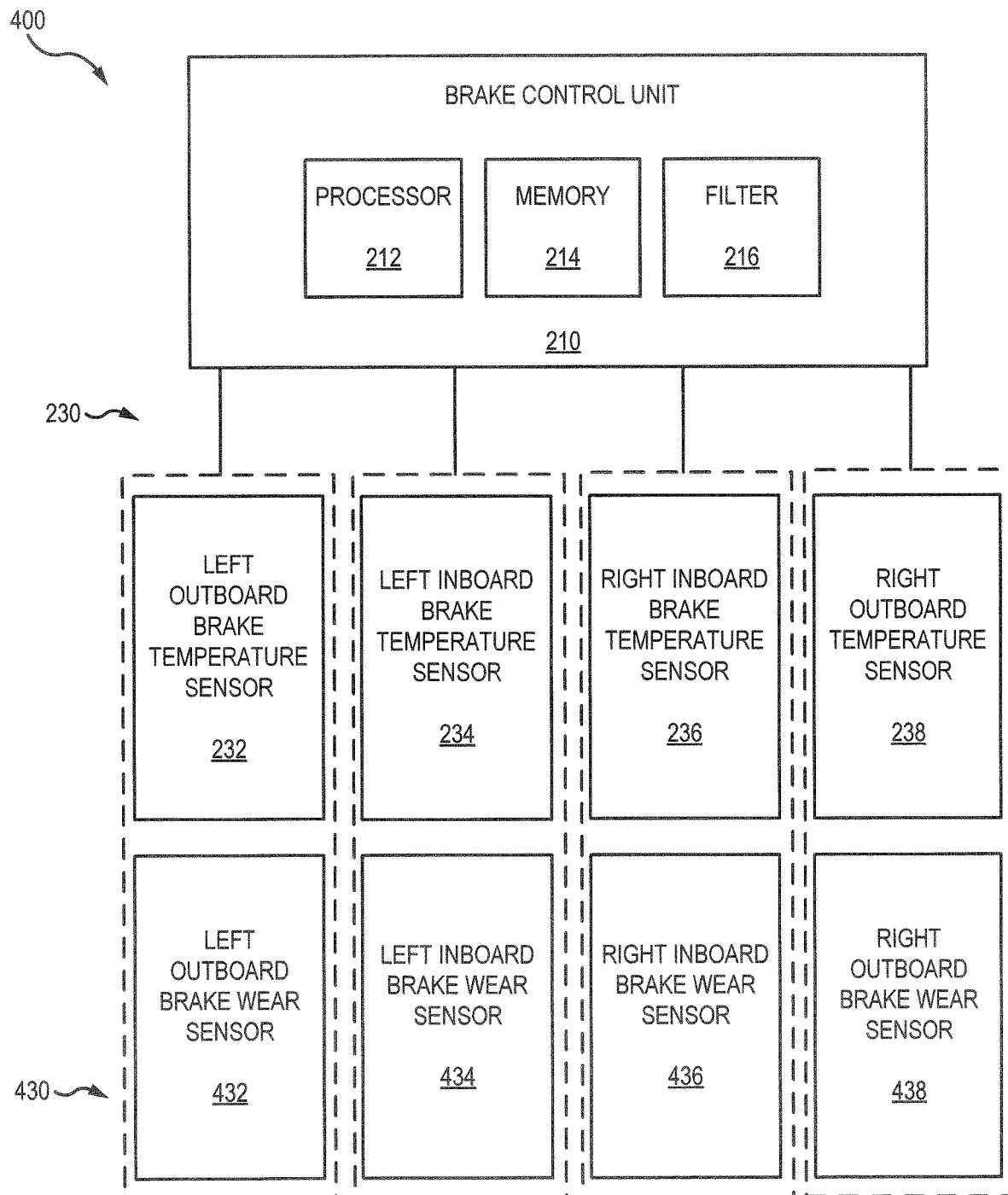
FIG. 4 is a braking system having a brake control unit (BCU) of the aircraft of FIG. 1, in accordance with various embodiments.

Referring now to FIG. 4, an aircraft braking system 400, in accordance with various embodiments, is disclosed. Aircraft braking system 400 may be configured to select a brake for an aircraft (e.g., aircraft 1 of FIG. 1) during a taxiing phase, or the like.

Aircraft braking system 400 comprises a BCU 210, brake temperature sensors 230 and brake wear sensors 430. For example, aircraft braking system 400 may comprise a left outboard brake wear sensor 432, a left inboard brake wear sensor 434, a right inboard brake wear sensor 436, and a right outboard brake wear sensor 438. In various embodiments, and with brief reference again to FIG. 1, LMLG 12 and RMLG 14 may each comprise two or more wheels, and a brake wear sensor 430 may be coupled to each wheel of LMLG 12 and RMLG 14. For example, LMLG 12 may comprise an axle comprising a left outboard brake wear sensor 432 coupled proximate the left outboard brake and a left inboard brake wear sensor 434 coupled proximate a left inboard brake. Similarly, RMLG 14 may comprise an axle comprising a right outboard brake wear sensor 438 coupled proximate a right outboard brake and a right inboard brake wear sensor 436 coupled proximate a right inboard brake. The various components may be electrically coupled. In various embodiments, the various components may communicate via wireless communications. For example, brake wear sensors 430 may wirelessly transmit temperature measurements to BCU 210.

In various embodiments, brake wear sensors 430 may be configured to measure the current wear state of a brake stack and relay the information to BCU 210. In various embodiments, brake wear sensors 430 comprise a linear variable differential transform (LVDT) or a similar mechanism configured to measure linear displacement or position. The brake wear sensors 430 may push against a brake pressure plate of a respective brake and determine a current wear state.

Upon landing, brakes heat up rapidly from the heat generated by the braking during landing. As such, the brakes are already hot after a landing event, so the wear rate of the brakes is significantly reduced compared to an outbound taxiing event (i.e., the taxi to the runway prior to takeoff). By only applying two of four brakes on an outbound taxi event, the brakes being used will raise in temperature more quickly than if all four brakes were applied. An outbound taxi event, as described herein, is a taxiing event of an aircraft prior to takeoff (e.g., an aircraft leaving the gate, taxiing to the runway, and/or taking off). By operating at a higher temperature, the wear rate of the brakes being used will be lower than if they were operating at a lower temperature. By only applying two of four brakes at a time, the life of each brake will be increased due to less use and lower wear rates when in use. Additionally, the temperature of the brakes being used may be monitored during an outbound taxi event and/or ensure that the brakes being used do not overheat.

Figure 5:
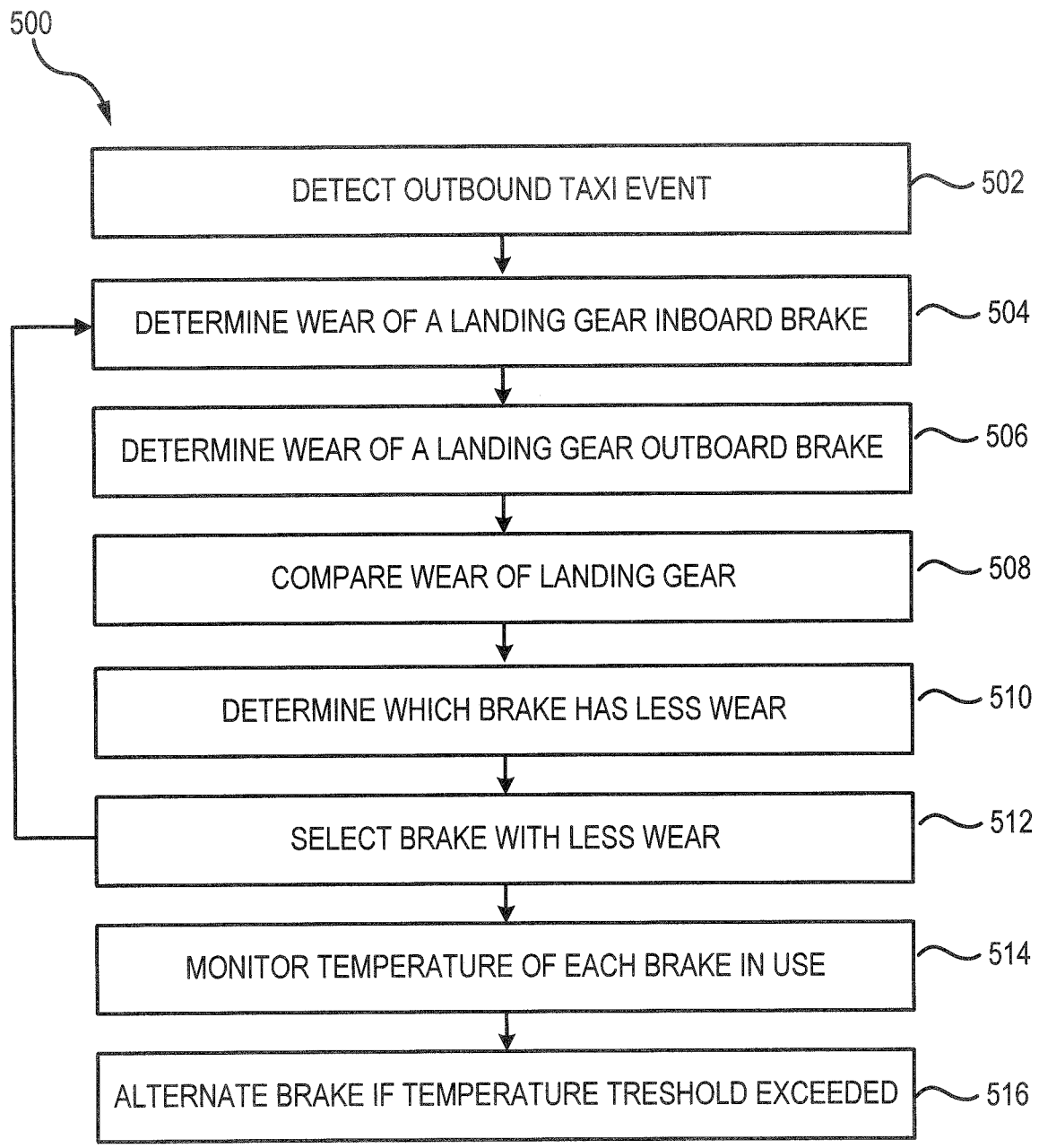
FIG. 5 is a method for selecting an inboard or outboard brake of an aircraft, in accordance with various embodiments.

Referring now to FIG. 5 and continued reference to FIG. 4, a method 500 for actively selecting either an outboard or inboard brake, in accordance with various embodiments, is depicted. Method 500 comprises detecting an outbound taxi event for an aircraft (step 502). For example, BCU 210 may receive a command from a braking system, a pilot, and or the like, indicating the aircraft is about to begin an outbound taxi event prior to takeoff. In response to detecting an outbound taxi event, the BCU 210 may determine the current wear state of a landing gear inboard brake (step 504). "Current wear state," as referred to herein, is the wear of a brake, measured in inches (or cm) at a given time while the method is being performed. BCU 210 may be configured to determine the wear of an inboard brake on a left landing gear and/or a right landing gear by use of a brake wear sensor 430 or by calculating the current brake wear state. For example, BCU 210 may calculate brake wear if brake wear sensors 430 are unavailable. With brief reference to FIG. 3, BCU 210, via processor 212, may be configured to receive inboard brake application history from aircraft data source 350. The inboard brake application history may comprise pressure, distance, time, and temperature data. BCU 210 may utilize brake application history to calculate a predicted wear of a landing gear inboard brake, for example, a left landing gear inboard brake. Next, the BCU 210 may determine a current wear state of a respective landing gear outboard brake (step 506). "Respective," as referred to herein refers to an outboard brake that is opposite the inboard brake and on the same landing gear as the inboard brake (e.g., a right landing gear inboard brake is respective landing gear inboard brake of a right landing gear outboard brake). For example, with brief reference to FIG. 1, outboard wheel 13A is a respective outboard wheel of inboard wheel 13B of LMLG 12

The method may further comprise comparing the current wear state of the outboard brake to the current wear state of the inboard brake (step 508). The BCU 210, via the processor, may compare the current wear state of the inboard brake to the current wear state of the outboard brake. Based on the comparison, the BCU 210, via the processor, may determine the brake with less wear (step 510). The brake with less wear will have a lower current wear state. Then, the BCU 210, via the processor 212, will select the brake with the lower current wear state (step 512). The process of steps 504 through 512 may then be repeated for the other main landing gear. For example, with brief reference to FIG. 1, LMLG 12 may be assessed first and an outboard or inboard brake of LMLG 12 may be selected for use in the taxiing event. Then, RMLG 14 may be assessed second and an outboard or inboard brake of RMLG 14 may be selected for use in an outbound taxiing event. Although described as steps 504 through 512 being performed in succession, the steps being performed for both the LMLG 12 and RMLG 14 simultaneously is within the scope of this disclosure.

Once an outboard brake or an inboard brake is selected for a respective landing gear, the selected brake is used exclusively during the taxiing outbound event. For example, the BCU 210 may select an outboard brake for LMLG 12 and an inboard brake for RMLG 14. During the taxiing event, only outboard brake for LMLG 12 will be used and only inboard brake for RMLG 14 will be used. By selecting a brake from LMLG 12 and RMLG 14, differential braking may be maintained throughout taxiing.

Figure 7:
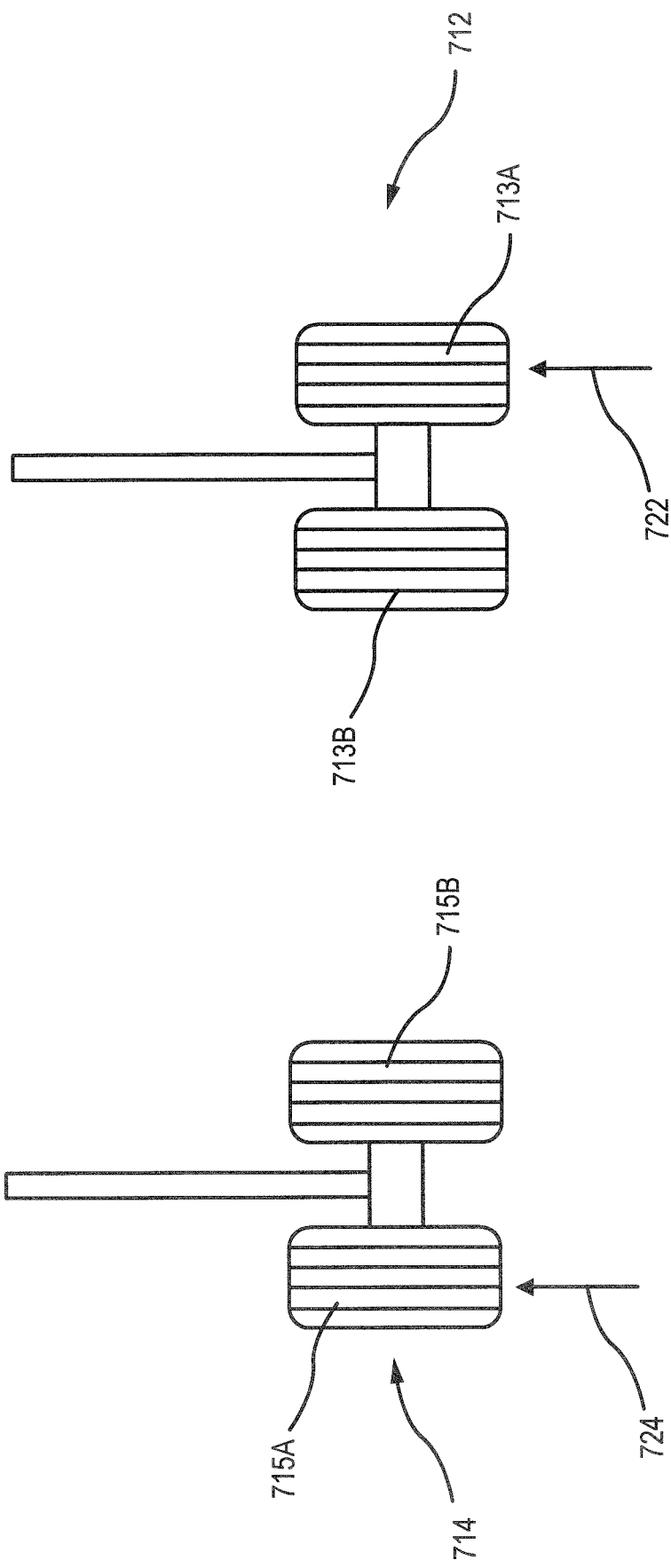
FIG. 7 is a landing gear system during taxiing of an aircraft, in accordance with various embodiments.

For example, with reference to FIG. 7, a main landing gear system during taxiing, in accordance with various embodiments is depicted. The landing gear system may comprise a left main landing gear (LMLG) 712 and a right main landing gear (RMLG) 714. LMLG 712 may comprise a left outboard wheel 715A and a left inboard wheel 715B. Similarly, RMLG 714 may comprise a right outboard wheel 713A and a right inboard wheel 713B. In various embodiments, during taxiing, an aircraft, via the BCU, may apply a left landing gear braking force 722 to LMLG 712 and/or a right landing gear braking force 724 to RMLG 714. Differential braking is when a left landing gear braking force 722 and a right landing gear braking force 724 differ. For example, if left landing gear braking force 722 is less than right landing gear braking force 724, then the aircraft may turn right.

During the outbound taxi event, the BCU 210 continuously monitors the selected left landing gear brake and the selected right landing gear brake from step 512 (step 514). The BCU 210 may, via the processor 212, compare a temperature of each selected brake with a predetermined threshold temperature for the brake. The threshold temperature may be a temperature at which the landing gear would not be able to dispatch after takeoff if takeoff were to be aborted. If a predetermined threshold temperature were exceeded by a selected brake, the BCU, via the processor, may alternate from the unselected brake to the selected brake (step 516). For example, if outboard brake of LMLG 12 were selected and in use during an outbound taxiing event, and the outboard brake exceeds the predetermined temperature threshold, the BCU, via the processor, would alternate from the outboard brake of LMLG 12 to the inboard brake of LMLG 12.

Figure 6:
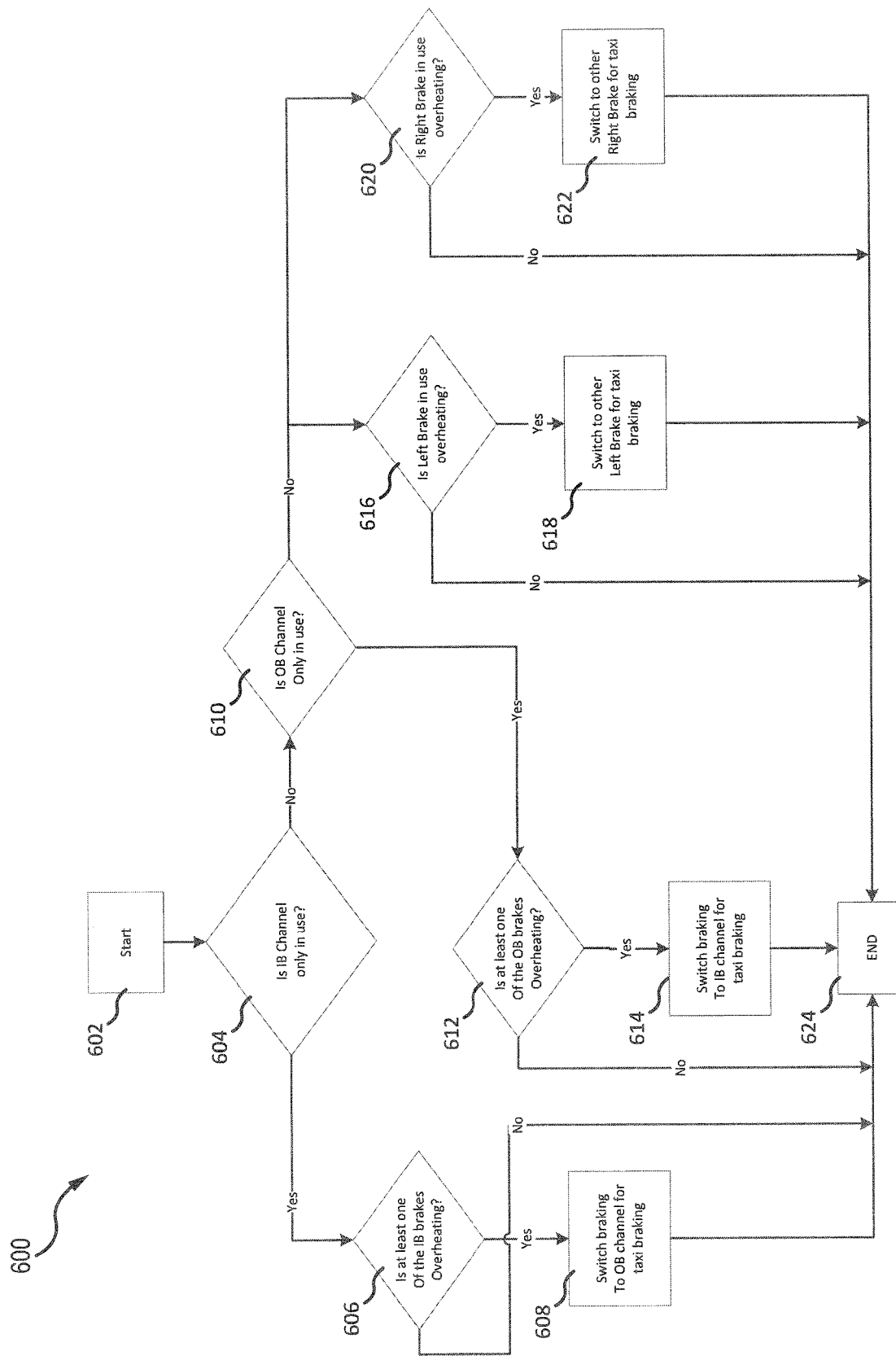
FIG. 6 is a method for monitoring a brakes of an aircraft, in accordance with various embodiments.

Referring now to FIG. 6, a method 600 may be used to monitor a selected brake during outbound taxiing of an aircraft. The method 600 may start in block 602. In block 604, the BCU may determine that an inboard channel is only in use during the taxi event. For example, the BCU may make this determination based on a selected left landing gear brake being an inboard brake and a selected right landing gear brake being an inboard brake.

If the result of block 604 is false then the method 600 may proceed to block 610.

Otherwise, the method 600 may proceed to block 606. In block 606, the BCU may monitor both inboard brakes (e.g., left landing gear inboard brake and right landing gear inboard brake). The BCU monitors whether the selected left brake temperature and/or the selected right brake temperature, measured by a left inboard brake temperature sensor and a right inboard brake temperature sensor, is/are overheating by determining if the brake temperature(s) exceed a threshold temperature.

If block 606 is false, then the method 600 may end at block 624. Otherwise, the method 600 may proceed to block 608. In block 608, the braking may be switched, by the BCU, from an inboard channel to an outboard channel for the remainder of taxiing. In various embodiments, the BCU may switch both the left landing gear inboard brake and the right landing gear inboard brake to their respective outboard brake. In various embodiments, the inboard brake that is overheating may be the only brake switched to its respective outboard brake.

Referring back to block 610, if the result of block 604 is false, then the method proceeds to block 610. In block 610, the BCU may determine that an outboard channel is only in use during the taxi event. For example, the BCU may make this determination based on a selected left landing gear brake being an outboard brake and a selected right landing gear brake being an outboard brake.

If the result of block 610 is false, then the method 600 may proceed to blocks 616 and 620. Otherwise, the method may proceed to block 612. In block 612, the BCU may monitor both outboard brakes (e.g., left landing gear outboard brake and right landing gear outboard brake). The BCU monitors whether the selected left brake temperature and/or the selected right brake temperature, measured by a left outboard brake temperature sensor and a right outboard brake temperature sensor, is/are overheating by determining if the brake temperature(s) exceed a threshold temperature.

If block 612 is false, then the method 600 may end at block 624. Otherwise, the method 600 may proceed to block 614. In block 614, the braking may be switched, by the BCU, from an outboard channel to an inboard channel for the remainder of taxiing. In various embodiments, the BCU may switch both the left landing gear outboard brake and the right landing gear outboard brake to their respective inboard brake. In various embodiments, the outboard brake that is overheating may be the only brake switched to its respective inboard brake.

Referring back to block 616, if block 610 is false, the method 600 may proceed to block 616. In block 616, the BCU may monitor the selected left landing gear brake (e.g., left landing gear outboard brake or left landing gear inboard brake). The BCU monitors whether the selected left brake temperature, measured by the selected left brake temperature sensor, is overheating by determining if the brake temperature exceeds a threshold temperature.

If block 616 is false, then the method 600 may end at block 624. Otherwise, the method 600 may proceed to block 618. In block 618, the braking may be switched, by the BCU, from the selected left landing gear brake to the un-selected left landing gear brake for the remainder of taxiing.

Referring back to block 620, if block 610 is false, the method 600 may proceed to block 620. In block 620, the BCU may monitor the selected right landing gear brake (e.g., right landing gear outboard brake or right landing gear inboard brake). The BCU monitors whether the selected right brake temperature, measured by the selected right brake temperature sensor, is overheating by determining if the brake temperature exceeds a threshold temperature.

If block 620 is false, then the method 600 may end at block 624. Otherwise, the method 600 may proceed to block 622. In block 622, the braking may be switched, by the BCU, from the selected right landing gear brake to the un-selected right landing gear brake for the remainder of taxiing.

In various embodiments, if block 610 is false, blocks 616 and 620 may be performed simultaneously.

During an outbound taxiing event, the brakes are often colder, which generates a significantly higher wear rate than warmer brakes. Method 500 allows selection of an inboard or an outboard brake for exclusive use during an outbound taxiing event. This may allow the selected brake to heat up faster than it would if both the inboard and the outboard brake were being utilized. As such, the selected brake may reach a temperature at which the wear rate is reduced compared to if both brakes were being utilized. The method 500 may produce better brake life than prior methods by operating selected brakes at hotter temperatures resulting in decreased wear over time. For example, using a brake at a temperature of 500 F may experience a decrease in wear rate of 60% compared to a same brake used at a temperature of 200 F.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for active brake selection, comprising:
   detecting, by a brake control unit (BCU), an outbound taxiing event in an aircraft;
   determining, by the BCU, a first inboard wear state of a left landing gear inboard brake and a first outboard wear state of a left landing gear outboard brake;
   selecting, by the BCU, the left landing gear inboard brake or the left landing gear outboard brake as a selected left landing gear brake for exclusive use during the outbound taxiing event;
   determining, by the BCU, a second inboard wear state of a right landing gear inboard brake and a second outboard wear state of a right landing gear outboard brake;
   selecting, by the BCU, at least one of the right landing gear inboard brake or the right landing gear outboard brake as a selected right landing gear brake for exclusive use during the outbound taxiing event.

2. The method of claim 1, further comprising:
   monitoring, by the BCU, a first temperature of the selected left landing gear brake and a second temperature of the selected right landing gear brake during the outbound taxiing event.

3. The method of claim 2, further comprising:
   alternating, by the BCU, the selected left landing gear brake to an unselected left landing gear brake if at least one of the first temperature exceeds a predetermined temperature threshold or the selected right landing gear brake to an unselected right landing gear brake if the second temperature exceeds the predetermined temperature threshold.

4. The method of claim 1, wherein the first inboard wear state, the first outboard wear state, the second inboard wear state, and the second outboard wear state are determined by brake wear sensors comprising a linear variable differential transform (LVDT) configured to measure linear displacement of a brake stack.

5. The method of claim 1, wherein the first inboard wear state, the first outboard wear state, the second inboard wear state, and the second outboard wear state are calculated, by the BCU, using a brake application history from an aircraft data source.

6. The method of claim 2, wherein the monitoring of the first temperature is by a temperature probe proximate the selected left landing gear brake.

7. A system for active brake selection, comprising:
   a left landing gear outboard brake temperature sensor coupled to a left landing gear of an aircraft;
   a left landing gear inboard brake temperature sensor coupled to the left landing gear of the aircraft;

a right landing gear outboard brake temperature sensor coupled to a right landing gear of the aircraft;

a right landing gear inboard brake temperature sensor coupled to the right landing gear of the aircraft; and a brake control unit (BCU), wherein the BCU performs operations comprising:

detecting, by the BCU, an outbound taxiing event in the aircraft;

determining, by the BCU, a first inboard wear state of a left landing gear inboard brake and a first outboard wear state of a left landing gear outboard brake;

selecting, by the BCU, the left landing gear inboard brake or the left landing gear outboard brake as a selected left landing gear brake for exclusive use during the outbound taxiing event;

determining, by the BCU, a second inboard wear state of a right landing gear inboard brake and a second outboard wear state of a right landing gear outboard brake; and selecting, by the BCU, the right landing gear inboard brake or the right landing gear outboard brake as a selected right landing gear brake for exclusive use during the outbound taxiing event.

8. The system of claim 7, further comprising a left landing gear outboard wear sensor coupled to the left landing gear of the aircraft, the left landing gear outboard wear sensor in electronic communication with the BCU.

9. The system of claim 7, wherein the operations further comprise: monitoring, by the BCU, a first temperature measured by a first temperature sensor of the selected left landing gear brake and a second temperature measured by a second temperature sensor of the selected right landing gear brake during the outbound taxiing event.

10. The system of claim 9, wherein the operations further comprise: alternating, by the BCU, the selected left landing gear brake to an unselected left landing gear brake if the first temperature exceeds a predetermined temperature threshold or the selected right landing gear brake to an unselected right landing gear brake if the second temperature exceeds the predetermined temperature threshold.

11. The system of claim 8, wherein the left landing gear outboard wear sensor comprises a linear variable differential transform (LVDT).

12. The system of claim 7, further comprising an aircraft data source electrically coupled to the BCU.

13. The system of claim 12, wherein the first inboard wear state is determined by calculating an expected first inboard wear state based on a first inboard brake application history provided by the aircraft data source.

14. A brake control unit (BCU), comprising:

a processor; and a non-transitory, tangible computer readable storage medium in electronic communication with the processor, the non-transitory, tangible computer readable storage medium having instructions stored thereon that, in response to execution by the processor cause the processor to perform operations comprising:

detecting, by the processor, an outbound taxiing event in an aircraft;

determining, by the processor, a first inboard wear state of a left landing gear inboard brake and a first outboard wear state of a left landing gear outboard brake;

selecting, by the processor, the left landing gear inboard brake or the left landing gear outboard brake as a selected left landing gear brake for exclusive use during the outbound taxiing event;

determining, by the processor, a second inboard wear state of a right landing gear inboard brake and a second outboard wear state of a right landing gear outboard brake; and selecting, by the processor, the right landing gear inboard brake or the right landing gear outboard brake as a selected right landing gear brake for exclusive use during the outbound taxiing event.

15. The BCU of claim 14, further comprising an aircraft data source in electronic communication with the processor, wherein the aircraft data source is configured to transmit brake application history to the processor.

16. The BCU of claim 14, wherein the operations further comprise: monitoring, by the processor, a first temperature of the selected left landing gear brake and a second temperature of the selected right landing gear brake during the outbound taxiing event.

17. The BCU of claim 16, wherein the operations further comprise: alternating, by the processor, the selected left landing gear brake to an unselected left landing gear brake if the first temperature exceeds a predetermined temperature threshold or the selected right landing gear brake to an unselected right landing gear brake if the second temperature exceeds the predetermined temperature threshold.

18. The BCU of claim 15, wherein the first inboard wear state, the first outboard wear state, the second inboard wear state, and the second outboard wear state are calculated, by the processor, using the brake application history from the aircraft data source.

19. The BCU of claim 14, wherein the processor is in electrical communication with a plurality of brake wear sensors.

20. The BCU of claim 19, wherein the processor is in electrical communication with a plurality of brake temperature sensors.

* * * * *